(12) United States Patent
Pollock

(10) Patent No.: US 9,065,816 B2
(45) Date of Patent: Jun. 23, 2015

(54) SYSTEMS AND METHODS OF INTEGRATING OPENID WITH A TELECOMMUNICATIONS NETWORK

(75) Inventor: Jason Pollock, Wellington (NZ)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 557 days.

(21) Appl. No.: 13/161,028

(22) Filed: Jun. 15, 2011

(65) Prior Publication Data

US 2012/0324558 A1 Dec. 20, 2012

(51) Int. Cl.
*H04W 12/06* (2009.01)
*H04L 29/06* (2006.01)

(52) U.S. Cl.
CPC ........ *H04L 63/0815* (2013.01); *H04L 63/0876* (2013.01); *H04L 63/08* (2013.01); *H04W 12/06* (2013.01)

(58) Field of Classification Search
CPC . H04L 63/08; H04L 63/0815; H04L 63/0876; H04L 63/0884; H04W 12/06
USPC .................................................. 726/8, 12, 2
See application file for complete search history.

(56) References Cited

U.S. PATENT DOCUMENTS

| 8,483,163 | B2 * | 7/2013 | Hellgren et al. | 370/329 |
| 2003/0061512 | A1 * | 3/2003 | Flurry et al. | 713/201 |
| 2008/0010379 | A1 * | 1/2008 | Zhao | 709/226 |
| 2009/0177650 | A1 * | 7/2009 | Petersson et al. | 707/5 |
| 2010/0227611 | A1 * | 9/2010 | Schmidt et al. | 455/434 |
| 2011/0188508 | A1 * | 8/2011 | Hjelm et al. | 370/401 |
| 2012/0028608 | A1 * | 2/2012 | Su et al. | 455/411 |

FOREIGN PATENT DOCUMENTS

| WO | WO 03073783 | 9/2003 |
| WO | WO 2010041347 | 4/2010 |

OTHER PUBLICATIONS

International Search Report dated Sep. 20, 2012 for Application No. PCT/US2012/042629, 10 pages.
Ahmed, A., "A User Friendly and Secure OpenID Solution for Smart Phone Platforms," Master's Thesis, Jun. 20, 2010, Aalto University, School of Science and Technology, Espoo, Finland, 103 pgs.
Wikipedia, "Generic Bootstrapping Architecture," http://en.wikipedia.org/wiki/Generic_Bootstrapping_Architecture, Jun. 16, 2011, 1 pg.

* cited by examiner

*Primary Examiner* — Kaveh Abrishamkar
*Assistant Examiner* — Ngoc D Nguyen
(74) *Attorney, Agent, or Firm* — Tucker Ellis LLP

(57) ABSTRACT

A solution is described which allows mobile devices to specify that certain sites are allowed to be logged into based on the device credentials alone. The solution integrates OpenID with a telecommunications network in order to verify the user's identity. This verification is based on the trust that the telecom carrier has to identify the subscriber at the GGSN. The solution splits the OpenID Provider (OP) into two systems—an internal OP and an external OP. The external OP can reside in the public network and can allow the user to authenticate with a password. The internal OP resides in the private network of the carrier and is directly connected to the GGSN such that it is only reachable from the GGSN.

20 Claims, 4 Drawing Sheets

SYSTEMS AND METHODS OF INTEGRATING OPENID WITH A TELECOMMUNICATIONS NETWORK

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates generally to mobile communications and telecommunication networks and in particular to authenticating mobile devices in telecommunication networks.

BACKGROUND

In recent years, people have been accessing Internet services more and more frequently from their mobile devices. For example, smart phones, tablets, personal digital assistants (PDAs) and other handheld computers have now become almost fully integrated with most Web sites and can access a wide variety of services on the Internet. Many of these services require the subscriber of a mobile device to be authenticated, such as by assigning a username, password to the user. However, due to the compact size and limited keyboard capabilities of such devices, it can be quite unpleasant for a subscriber to enter a username and password or other authentication information using the device.

There have been numerous standards proposed, some of which attempt to at least partially address the authentication issues for mobile devices. One such existing standard is Generic Bootstrapping Architecture (GBA), which allows applications on the handset to authenticate themselves to a network service, using the SIM card to provide authentication. Under this standard, users can be authenticated if they own a valid identity on a Home Location Register (HLR) or a Home Subscriber Server (HSS). The authentication is based on a shared secret key, where one key is located in the user's mobile phone and the other is on the HLR/HSS.

Another standard entitled OpenID has attempted to reduce the number of identities that each owner possesses by allowing users to consolidate their digital identities. Under this open standard, users can be authenticated in a decentralized manner. For example, when a user agent (UA) invokes a particular service, that service can query an open ID provider (OP) which will authenticate the user agent on behalf of the service that is relying on the OP. In this manner, the relying party or service can ensure that the user is authenticated based on a shared secret, which has been previously established between the relying party and the OP.

Even in light of such standards, a number of limitations and shortcomings are still left unaddressed. For example, most common authentication mechanism for OpenID implementations remains a username and password combination, which can be burdensome on mobile subscribers due to the reasons previously mentioned. At least one solution integrating OpenID with GBA has been proposed, however it is quite likely that such a solution would require the telecommunication companies to buy additional network hardware, require application developers to modify their code and also require the handset unit to change as well. Not surprisingly, solutions that require such a change in the entire ecosystem of the telecommunications network have not been able to gain significant traction.

Telecommunications companies and mobile network operators (MNOs) already have a trust relationship with the mobile device and the subscriber. It would be desirable to export that trust relationship from the handset to Internet services. It would also be advantageous to export this trust while minimizing the number changes among the numerous entities that are involved and while addressing the deficiencies mentioned above. Applicant has identified these, as well as other needs that currently exist in the art in coming to conceive the subject matter of the present disclosure.

SUMMARY OF INVENTION

In accordance with various embodiments, a solution is described which allows a user of a mobile device to specify that certain sites are allowed to be logged into based on the device credentials alone. The solution integrates OpenID with a telecommunications network in order to verify the user's identity. This verification is based on the trust that the telecom carrier has and can use to identify the mobile device and the subscriber at the Gateway GPRS Support Node (GGSN).

The process for identifying the subscriber is based on splitting an OpenID provider (OP) into two systems, an internal OP and an external OP. The external OP can reside in the public network and can allow the user to authenticate with a password. The internal OP resides in the private network of the carrier and is directly connected to the GGSN such that it is only reachable from the GGSN. The process for identifying the subscriber begins when a mobile device (user agent) invokes a relying party (RP) service. The RP can query an external OP, requesting a validation uniform resource locator (URL) for the subscriber. The RP redirects the user agent (UA) to a validation URL on the internal OP provider. The internal OP can validate the subscriber by IP address or if the subscriber elects, a user name and password. The internal OP redirects the US back to an accepted URL provided by the RP. The RP can then validate the response with the external OP.

DETAILED DESCRIPTION

The invention is illustrated by way of example and not by way of limitation in the figures of the accompanying drawings in which like references indicate similar elements. References to embodiments in this disclosure are not necessarily to the same embodiment, and such references mean at least one. While specific implementations are discussed, it is understood that this is done for illustrative purposes only. A person skilled in the relevant art will recognize that other components and configurations may be used without departing from the scope and spirit of the invention.

In the following description, numerous specific details are set forth to provide a thorough description of the invention. However, it will be apparent to those skilled in the art that the invention may be practiced without these specific details. In other instances, well-known features have not been described in detail so as not to obscure the invention.

In accordance with various embodiments described throughout this disclosure, a solution is described to enable a user of a mobile device to specify that certain sites are allowed to be logged in based on the device credentials alone. The solution integrates OpenID with a telecommunications network in order to verify the user's identity. This verification is based on the trust that the telecom carrier has and can use to identify the mobile device and the subscriber at the Gateway GPRS Support Node (GGSN).

Currently, OpenID often requires the user to log in using a username and password. A typical OpenID flow can work as follows:

1. The user agent (UA) invokes a relying party (RP), providing an identifier
2. The RP queries the OpenID provider (OP), requesting the validation uniform resource locator (URL) for the subscriber
3. The RP redirects the UA to the validation URL on the OP
4. The OP validates the subscriber by any means, typically a username/password combination
5. The OP redirects the UA back to the "accepted" URL provided by the RP.
6. The RP validates the response with the OP.

A change in this situation can utilize the trust that the carrier has that they can identify the phone (and therefore the subscriber) at the Gateway General Packet Radio Service Support Node (GGSN). If the GGSN can identify the subscriber, it should be able to export that trust to the RP. In order to export this trust, the Open ID flow can become the following:

1. The UA invokes the RP, providing an identifier
2. The RP queries an external OpenID provider (OP), requesting the validation URL for the subscriber
3. The RP redirects the UA to the validation URL on the Internal OP
4. The internal OpenID provider (OP) validates the subscriber by IP address, or if the subscriber has elected, a username/password
5. The internal OP redirects the UA back to the "accepted" URL provided by the RP
6. The RP validates the response with the external OP.

Figure 1:
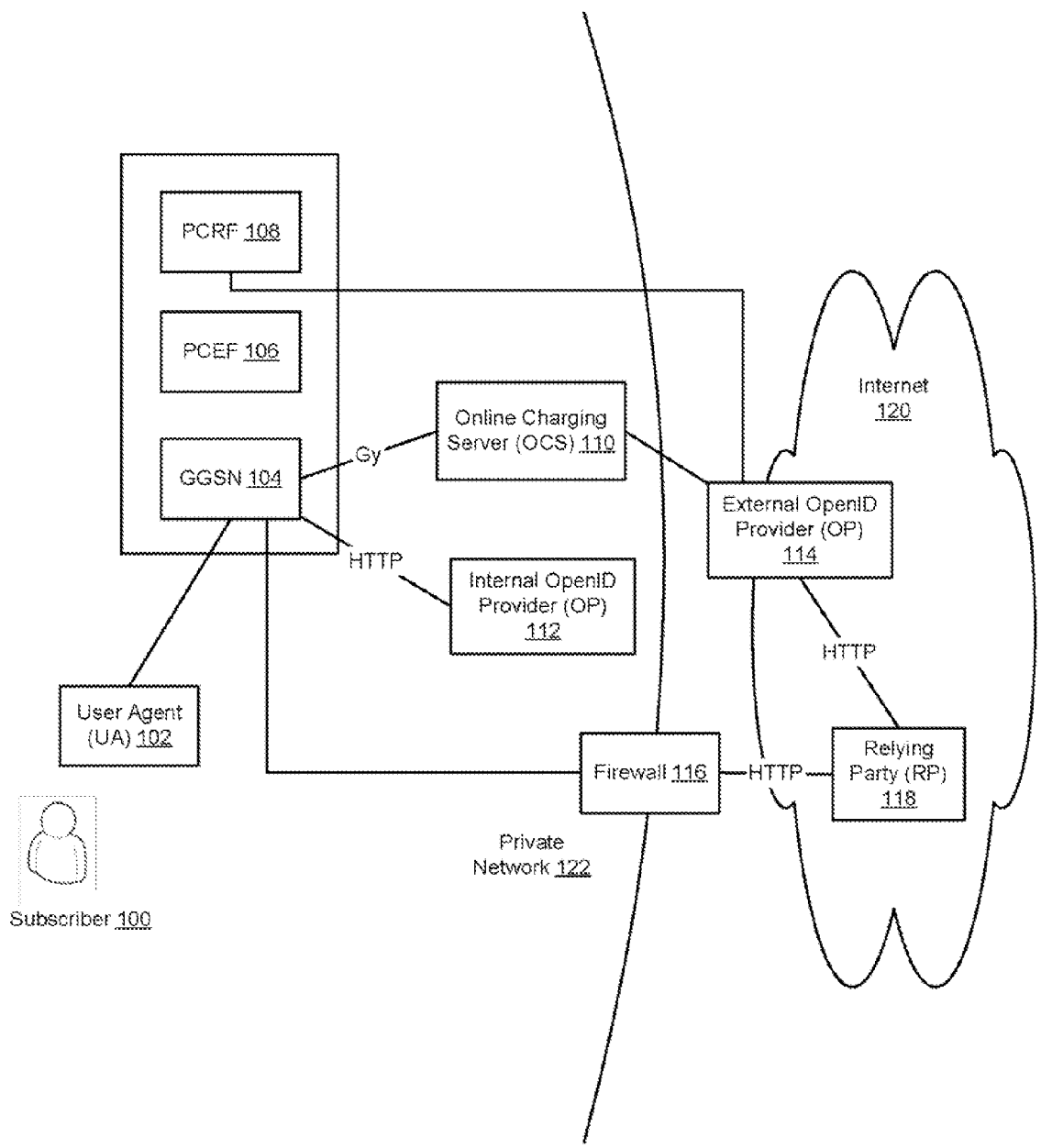
FIG. 1 is a system-level illustration of integrating the OpenID with a telecommunication network, in accordance with various embodiments of the invention.

FIG. 1 is a system-level illustration of integrating the OpenID with a telecommunication network, in accordance with various embodiments of the invention. Although this diagram depicts components as logically separate, such depiction is merely for illustrative purposes. It will be apparent to those skilled in the art that the components portrayed in this figure can be combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

As illustrated, the OpenID provider (OP) can be split into two separate systems, an internal OP 112 and an external OP 114. The term network can encompass at least two separate networks—the public network (e.g. Internet) 120 accessible to all entities; and the internal private network 122 of the telecom provider. Access to the private network is controlled and it is usually separated from the public network by way of a firewall 116 or other security measures. The external OP can reside in the public network and can allow the subscriber 100 to authenticate with a password. The internal OP resides in the private network of the carrier and is directly connected to the GGSN 104 such that it is only reachable from the GGSN. The process for identifying the subscriber begins when a mobile device (UA 102) invokes a relying party (RP) service 118. The RP can query an external OP 114, requesting a validation URL for the subscriber. The RP redirects the user agent (UA) to a validation URL on the internal OP provider 112. The internal OP can validate the subscriber by IP address or if the subscriber elects, a user name and password. The internal OP redirects the UA back to an accepted URL provided by the RP 118. The RP can then validate the response with the external OP.

In accordance with an embodiment, the GGSN can employ a Policy Control Rule Function (PCRF) 108 and a Policy Control Enforcement Function (PCEF) 106 to apply policies to the communications involving the carrier's subscribers. These components encompass Service Data Flow (SDF) detection, policy enforcement and flow-based charging functionalities. In addition, the GGSN can connect to an online charging server (OCS) 110, which is a system for allowing communication service providers to charge their subscribers in real time, based on service usage. Some (or all) of these components can play a roll in controlling access to the internal OP, as will be described in more detail later in this document.

Figure 2:
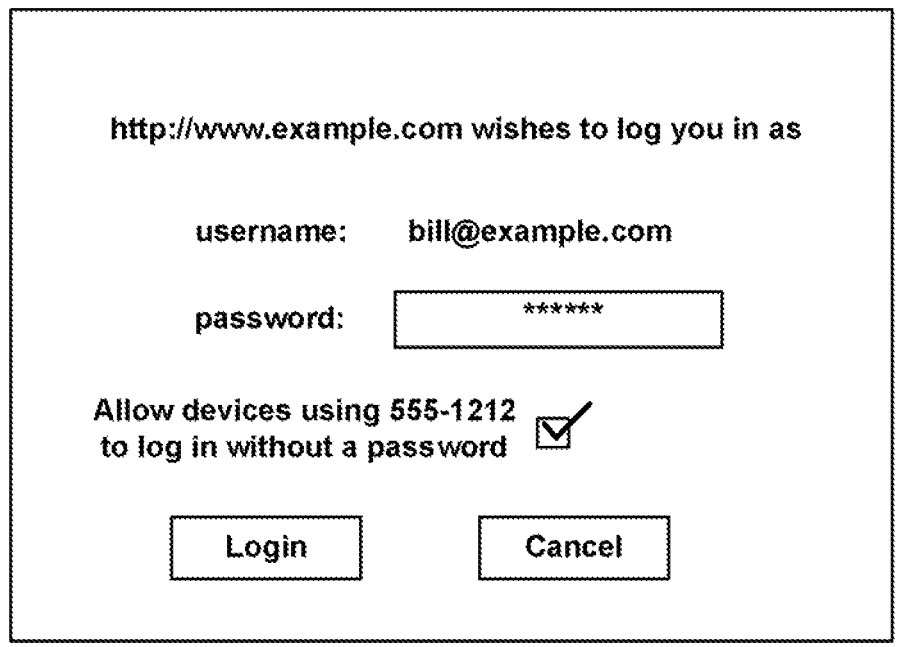
FIG. 2 is an illustration of a page presented to a UA once it is redirected to the internal OP, in accordance with various embodiments of the invention.

FIG. 2 is an illustration of a page presented to a UA once it is redirected to the internal OP, in accordance with various embodiments of the invention. It should be noted that this page is only an example and should not be construed to restrict all of the embodiments to require a user name and password combination upon first login.

As illustrated, on the internal OP, when the user agent (UA) is redirected there, the UA can be presented with a page to authenticate with a username and password combination. This page can also include an option to allow the device to log in without a password in the future. The UA is asked for a username/password. They are also given the option of allowing future logins from the device to that service to be password-free. In accordance with an embodiment, the UA will always be prompted for a password the first time the service is used, and the UA can elect to enable or disable the password-free login at any time.

In accordance with an embodiment, in order to allow password-free authentication, access to the Internal OP must be protected. Otherwise, if the Internal OP is accessible from any device other than the GGSN, it may be possible for a third party to emulate the UA and gain access to the RP.

In accordance with an embodiment, the solution can rely on splitting the OP into two systems. An External OP behaves as a regular OP, allowing the user to authenticate with a password. An Internal OP, on the other hand, is directly connected to the GGSN, and only reachable from the GGSN. Since the Internal OP is only reachable from the GGSN, it reduces the authentication problem to one of access control to the Internal OP. In accordance with various embodiments, the following are several methods of performing this access control:

1. The PCEF/PCRF on the GGSN is able to perform deep packet inspection (DPI), and able to perform validation on specific parts of the URL.

2. The PCEF/PCRF are able to receive real-time rule updates with specified IP address and ports.
3. The GGSN is able to initiate a new charging session for all connections to a specific IP address.

Deep Packet Inspection

In accordance with an embodiment, if the PCEF/PCRF are able to perform DPI, the Mobile Station International Subscriber Directory Number (MSISDN) for the subscriber is encoded into the request to the OP. The PCEF can then validate that URL, discarding all requests that do not contain an MSISDN which matches the subscriber profile. If the subscriber has previously decided that the UA is allowed to have device-authenticated access to the RP, the Internal OP will then return a success response.

Real Time Rule Updates

In accordance with an embodiment, if the PCEF/PCRF are able to perform real-time updates, the External OP will allocate a port on the Internal OP. It will then construct a rule for the UA's MSISDN, allowing access to that port, passing this rule to the PCRF. The PCRF will update the PCEF, and then report success back to the External OP. The External OP will then inform the RP of the hostname/port combination to use on the Internal OP for access. The UA will then open a connection to that hostname and port. Since the rule is matched, the PCEF will allow the GGSN to connect to the UA to the Internal OP. The Internal OP trusts the GGSN, so it will report success to the authentication request. When the RP contacts the External OP to validate the response, the External OP will release the allocation and remove the rule from the PCRF.

New Charging Session

In accordance with an embodiment, if the GGSN is able to initiate a new charging session for each socket connection to a specific IP address, the ability of the OCS system can be used to perform real-time account modifications to perform this connection validation. As a non-limiting example, Oracle Network Charging and Control (NCC) product line provides this ability.

As in the Real Time Rule Update method, the External OP will allocate a port on the Internal OP. It will then inform the OCS of the port allocation, which will update the UA's profile with the information. Prior to sending the TCP SYN to the Internal OP, the GGSN will initiate a new charging session to the OCS, providing the IP address and port in the request. The OCS will then validate the IP address and Port against the allocation list, only responding with a success to the charging request if they match. As above, since the Internal OP trusts the GGSN, it is able to report success to the authentication request. When the RP contacts the External OP to validate the response, the External OP will release the allocation and update the UA's profile on the OCS.

Figure 3:
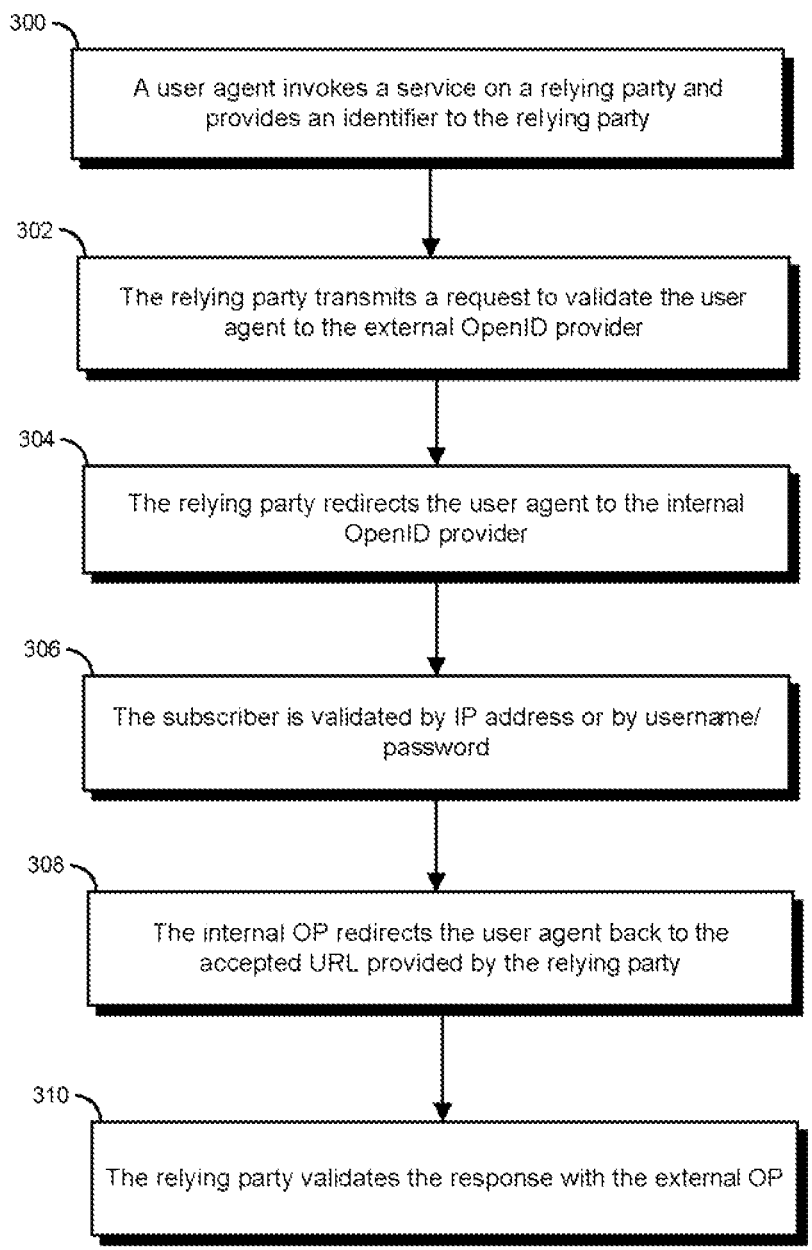
FIG. 3 is a flow chart illustration of integrating OpenID with a telecommunications network, in accordance with various embodiments of the invention.

FIG. 3 is a flow chart illustration of integrating OpenID with a telecommunications network, in accordance with various embodiments of the invention. Although this figure depicts functional steps in a particular sequence for purposes of illustration, the process is not necessarily limited to this particular order or steps. One skilled in the art will appreciate that the various steps portrayed in this figure can be changed, rearranged, performed in parallel or adapted in various ways. Furthermore, it is to be understood that certain steps or sequences of steps can be added to or omitted from this process, without departing from the spirit and scope of the invention.

As illustrated in step 300, the process begins when a user agent invokes a service on a relying party and provides an identifier to the relying party. The relying party then transmits a request to validate the user agent to the external OpenID provider (step 302) and also redirects the user agent to the internal OpenID provider (step 304). The internal OP validates the subscriber by IP address or by username/password, as shown in step 306. In step 308, the internal OP redirects the user agent back to the accepted URL provided by the relying party. Finally, the relying party confirms the response with the external OP, as shown in step 310.

Figure 4:
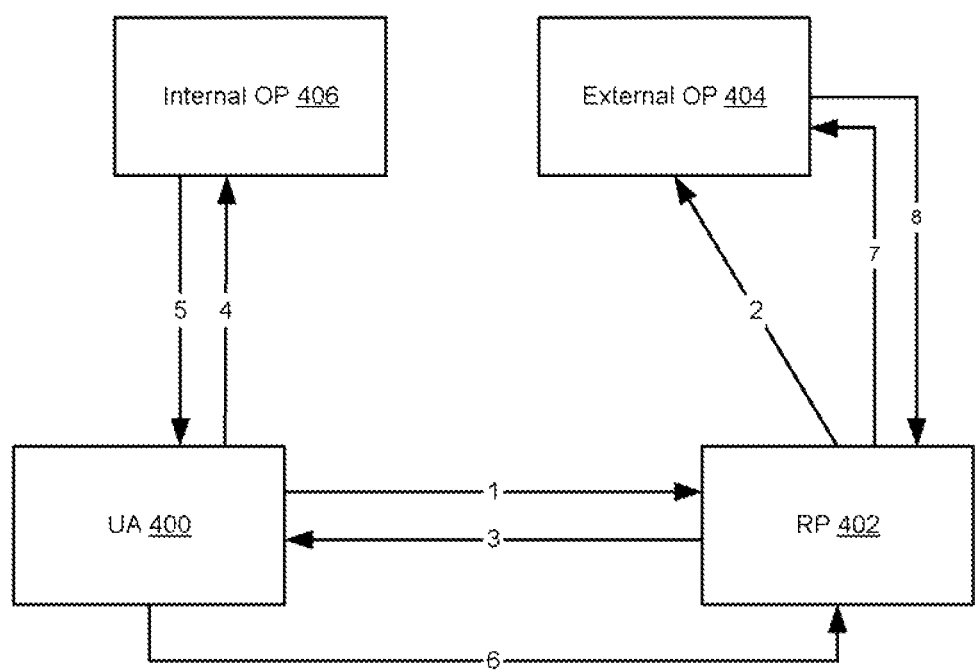
FIG. 4 is a sequence diagram of integrating OpenID with the telecom network, in accordance with various embodiments of the invention.

FIG. 4 is a sequence diagram of integrating OpenID with the telecom network, in accordance with various embodiments of the invention. It is noted that similarly to other figures described herein, the sequence of steps is shown only for purposes of illustration and is not necessarily intended to limit all embodiments to the particular order or steps. One skilled in the art will appreciate that the various steps portrayed in this figure can be changed, rearranged, performed in parallel or adapted in various ways. Furthermore, it is to be understood that certain steps or sequences of steps can be added to or omitted from this process, without departing from the spirit and scope of the invention.

As illustrated in FIG. 4, the process for identifying the subscriber begins when the UA 400 (e.g. web browser on the subscriber's mobile device) invokes a service on the RP 402. Upon invoking the service, the UA typically provides its identifier to the RP. The RP receives this identifier and uses it to contact the external OP 404, requesting validation of the UA. The RP also responds to the UA, redirecting the UA to the internal OP 406. Since access to the internal OP is limited to the GGSN, when the UA reaches the internal OP, it is validated. Once validated, the internal OP redirects the UA to an accepted URL provided by the RP. Finally, the RP can confirm the validation of the UA with the external OP.

Throughout the various contexts described in this disclosure, the embodiments of the invention further encompass computer apparatus, computing systems and machine-readable media configured to carry out the foregoing systems and methods. In addition to an embodiment consisting of specifically designed integrated circuits or other electronics, the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The various embodiments include a computer program product which is a storage medium (media) having instructions stored thereon/in which can be used to program a general purpose or specialized computing processor(s)/device(s) to perform any of the features presented herein. The storage medium can include, but is not limited to, one or more of the following: any type of physical media including floppy disks, optical discs, DVDs, CD-ROMs, microdrives, magneto-optical disks, holographic storage, ROMs, RAMs, PRAMS, EPROMs, EEPROMs, DRAMs, VRAMs, flash memory devices, magnetic or optical cards, nanosystems (including molecular memory ICs); and any type of media or device suitable for storing instructions and/or information. The computer program product can be transmitted in whole or in parts and over one or more public and/or private networks wherein the transmission includes instructions which can be used by one or more processors to perform any of the features presented herein. In certain embodiments, the transmission may include a plurality of separate transmissions. In accordance with one or more embodiments, the computer readable storage medium is non-transitory in nature.

The foregoing description of the preferred embodiments of the present invention has been provided for purposes of illustration and description. It is not intended to be exhaustive or to limit the invention to the precise forms disclosed. Many modifications and variations can be apparent to the practitioner skilled in the art. Embodiments were chosen and described in order to best explain the principles of the invention and its practical application, thereby enabling others skilled in the relevant art to understand the invention.

What is claimed is:

1. A system for authenticating users in a telecommunications network in cooperation with an OpenID provider on a public network external to the telecommunications network (external OP), said system comprising:
   a private network of said telecommunications network wherein said private network is protected from said public network by a firewall;
   a gateway node internal to the private network for authenticating mobile devices, each mobile device having an identifier and a user agent associated therewith;
   an Open ID provider internal to the private network (internal OP) that is connected to the gateway node, wherein the internal OP is reachable only from said gateway node over said private network of the telecommunications network; and
   wherein when the external OP receives a request from a relying party to validate a request from a user agent of a mobile device,
      the user agent is redirected to the internal OP,
      the user agent transmits a request including said identifier of said mobile device to the gateway node over said private network,
      the gateway node validates the request received from the user agent by validating that the identifier matches the identifier of the mobile device and forwarding the request directly to the internal OP over said private network,
      the internal OP validates the user agent using the identifier associated with the mobile device, and
      the internal OP responds by providing a response which redirects the user agent to an accepted URI provided by the relying party, whereby the relying party can validate the response from the internal OP with the external OP and authenticate the mobile device.

2. The system of claim 1, wherein the gateway node performs deep packet inspection, wherein the identifier is a Mobile Station International Subscriber Directory Number (MSISDN) encoded into the request to the internal OP and wherein the gateway node validates said request by discarding all requests in which the MSISDN does not match a subscriber of said mobile device.

3. The system of claim 1, wherein the gateway node receives real-time rule updates with specified address and port, wherein the system allocates a port on the internal OP and constructs a rule for said identifier associated with the mobile device in response to a request from the external OP, said rule granting access to said port for said identifier, and wherein said rule is passed to the gateway node.

4. The system of claim 1, wherein the internal OP comprises an online charging server (OCS).

5. The system of claim 1, wherein the gateway node is a Gateway for General Packet Radio Service (GPRS) Support Node (GGSN) that serves as a gateway between a GPRS wireless data network and one or more other networks, and wherein the gateway node further comprises:
   a Policy and Charging Enforcement Function (PCEF); and
   a Policy Control and Charging Rules Function (PCRF).

6. The system of claim 1, wherein the internal OP renders a page requesting a user name and password, said page further including an option to allow the mobile device to login without a password for subsequent requests.

7. The system of claim 1, wherein the internal OP validates the user agent without requiring a user name and password for requests subsequent to an initial request by a particular relying party.

8. A method for authenticating users in a telecommunications network in cooperation with an OpenID provider on a public network external to the telecommunications network (external OP), said method comprising:
   providing a private network of said telecommunications network wherein said private network is protected from said public network by a firewall;
   authenticating a mobile device of a subscriber using a gateway node internal to the private network, said mobile device having an identifier and a user agent associated therewith;
   providing an Open ID provider internal to the private network (internal OP) wherein the internal OP is reachable only from said gateway node over said private network of the telecommunications network;
   redirecting the user agent to said internal OP in response to the external OP receiving a request to validate the subscriber of the mobile device from a relying party;
   transmitting a request including said identifier of said mobile device from the user agent to the gateway node over said private network,
   validating the request received from the user agent in the gateway node by validating that the identifier matches the identifier of the mobile device and forwarding the request directly to the internal OP over said private network,
   sending a response from the internal OP to the user agent using the internal OP;
   redirecting the user agent to an accepted uniform resource identifier (URI) provided by the relying party whereby the relying party can validate the response from the internal OP with the external OP and authenticate the mobile device.

9. The method of claim 8, wherein the request to validate the subscriber of the mobile device is initiated when a user agent invokes a service on a relying party and provides said identifier to the relying party.

10. The method of claim 9, wherein the relying party initiates a request to validate the user agent upon having received the invocation of the service from the mobile device and transmits said request to validate the user agent to an external OP.

11. The method of claim 8, wherein the user agent is connected to the gateway node.

12. The method of claim 8, wherein validating the user agent is implemented by a gateway node performing deep packet inspection, wherein the identifier is a Mobile Station International Subscriber Directory Number (MSISDN) associated with the subscriber and encoded into the request to the internal provider and wherein the gateway node validates said request by discarding all requests that do not contain the MSISDN that matches the subscriber of said mobile device.

13. The method of claim 8, wherein the user agent is validated by a gateway node receiving real-time rule updates with specified address and port, said rule granting access to said port for said identifier associated with said mobile device, and wherein said rule is passed to the gateway node.

14. The method of claim 8, wherein the user agent is validated by a gateway node initiating a new charging session in an Online Charging Server (OCS), wherein the OCS updates a profile associated with said subscriber, and wherein the OCS validates the mobile device based on a port allocation.

15. The method of claim 11, wherein the telecommunications network comprises:
 a Policy and Charging Enforcement Function (PCEF); and
 a Policy Control and Charging Rules Function (PCRF).

16. The method of claim 8, wherein the internal OP renders a page requesting a user name and password, said page further including an option to allow the user agent to login without a password for subsequent requests.

17. The method of claim 8, wherein the internal OP validates the user agent without requiring a user name and password for requests subsequent to an initial request by a particular relying party.

18. The method of claim 8, wherein the user agent is a web browser of the mobile device invoking the relying party service.

19. A non-transitory computer readable storage medium storing a set of instructions executed by one or more processors for authenticating users in a telecommunications network, in cooperation with an OpenID provider on a public network external to the telecommunications network (external OP), which set of instructions, when executed, cause the one or more processors to perform a sequence of steps comprising:
 providing a private network of said telecommunications network wherein said private network is protected from said public network by a firewall;
 authenticating a mobile device of a subscriber using a gateway node internal to the private network, said mobile device having an identifier and a user agent associated therewith;
 providing an Open ID provider internal to the telecommunications network (internal OP) wherein the internal OP is reachable only from said gateway node over said private network of the telecommunications network;
 receiving a request to validate a subscriber of a mobile device from a relying party service to an external provider;
 redirecting the user agent to the internal OP by the relying party;
 transmitting a request including said identifier of said mobile device from the user agent to the gateway node over said private network,
 validating the request received from the user agent in the gateway node by validating that the identifier matches the identifier of the mobile device and forwarding the request directly to the internal OP over said private network, and
 sending a response from the internal OP to the user agent; and
 redirecting the user agent to an accepted uniform resource identifier (URI) provided by the relying party whereby the relying party can validate the response from the internal OP with the external OP and authenticate the mobile device.

20. The non-transitory computer readable storage medium of claim 19, wherein validating the user agent includes the gateway node performing deep packet inspection.

* * * * *